Nov. 7, 1961    E. REMLEY    3,007,595
COOKING UTENSILS
Filed Dec. 31, 1957    4 Sheets-Sheet 1
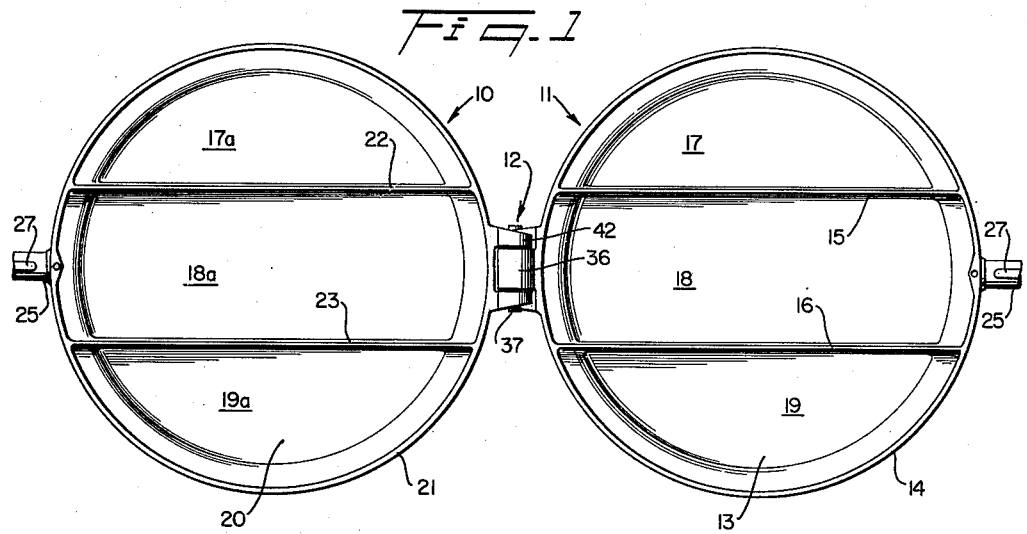
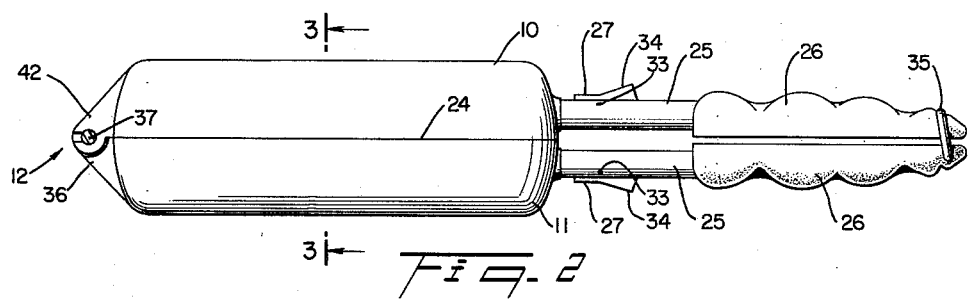
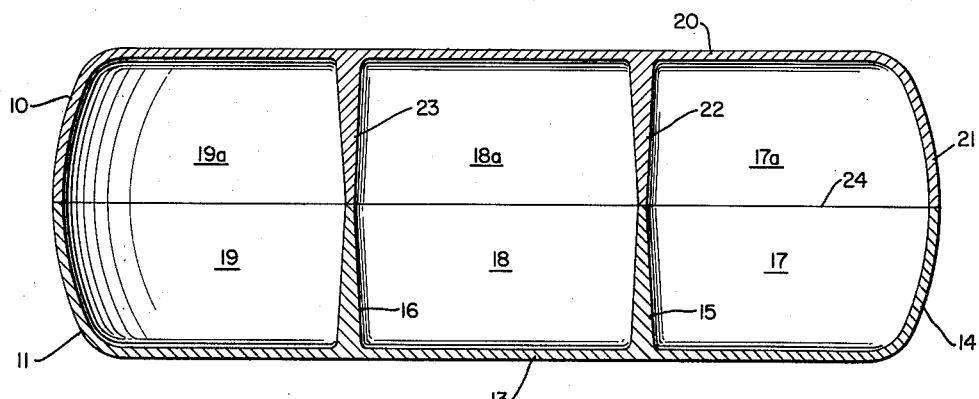
INVENTOR.
EUNICE REMLEY
BY
*J. G. Grier*
ATTORNEY Nov. 7, 1961  E. REMLEY  3,007,595
COOKING UTENSILS Filed Dec. 31, 1957  4 Sheets-Sheet 2

INVENTOR.
EUNICE REMLEY
BY
*J. A. Grier*
ATTORNEY

Nov. 7, 1961   E. REMLEY   3,007,595
COOKING UTENSILS
Filed Dec. 31, 1957   4 Sheets-Sheet 3
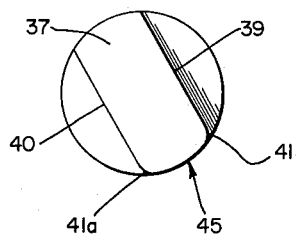
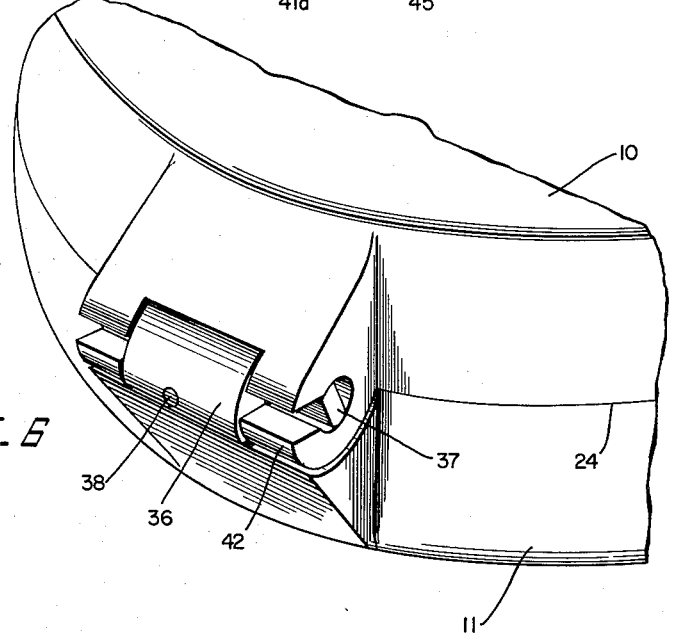
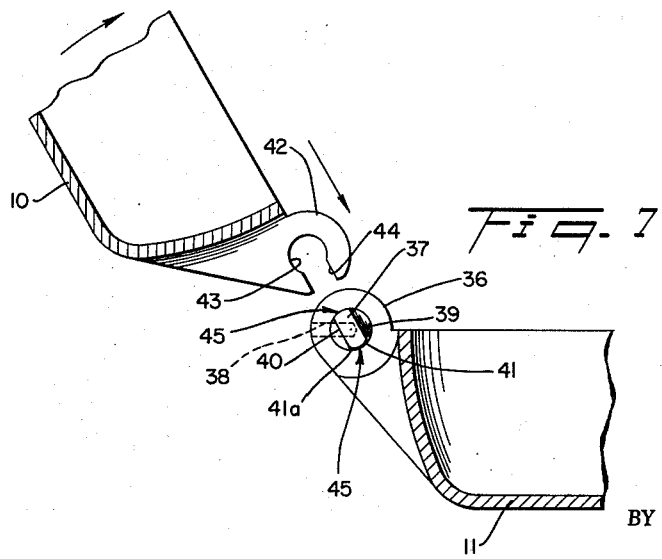
INVENTOR.
EUNICE REMLEY
BY
J. C. Grier
ATTORNEY Nov. 7, 1961  E. REMLEY  3,007,595
COOKING UTENSILS
Filed Dec. 31, 1957  4 Sheets-Sheet 4

INVENTOR.
EUNICE REMLEY
BY J. A. Grier
ATTORNEY

United States Patent Office 3,007,595
Patented Nov. 7, 1961

3,007,595
COOKING UTENSILS
Eunice Remley, 103 Park Ave., New York, N.Y.
Filed Dec. 31, 1957, Ser. No. 706,319
1 Claim. (Cl. 220—4)

The present invention pertains to improvements in cooking utensils, being a continuation in part of co-pending application Serial No. 466,068, filed November 1, 1954, now abandoned.

An object of the invention is to provide an improved multiple-recess cooking utensil combination comprising two complementary pan members adapted to be normally secured together to form a closed vessel operable in interchangeable top and bottom relationship to a source of heat.

A further object is to provide a device of the above nature in which the two pan members are articulated by means of an improved hinge structure combining extreme accuracy of fit in closed position with ease of separation when it is desired to use either or both of the pan members separately.

A further object is to provide a device of the above type including means to ensure accurate alignment between the mating upper and lower partition and rim surfaces of the two members without the use of extensive offset rims, grooves and the like which would present difficulties in cleaning.

Yet another object of the invention is the provision of a cooking utensil comprised of two substantially identical mating members each being adapted to being employed as a top or as a bottom whereby the sealed pan members may be turned over.

Another object is to provide a utensil combination of the above type in which the matched dividing partitions taper inward in the same manner in both the members to ensure even heat transfer to the food at the same rate regardless of which member is exposed to the source of heat, thus avoiding uneven cooking or burning when the vessel has been inverted during the cooking operation.

A still further object is to provide a pair of matching handles proportioned to be stored in the interior of the vessel when the latter is not in use, these handles being provided with latching means to attach them to the exteriors of the pan members and with means to lock the pan assembly shut when desired.

Other objects and advantages of the invention will become evident during the course of the following description in connection with the accompanying drawings, in which:

FIGURE 1 is a plan view of a typical embodiment of the utensil in opened position to show the complementary inner structures;

FIGURE 2 is an exterior side view of the same in closed position with the handle members in place and locked;

FIGURE 3 is an enlarged cross-section in the plane 3—3, FIGURE 2;

FIGURE 6 is a fragmental perspective end view of the closed utensil showing the improved hinge structure;

FIGURE 7 illustrates the method of joining and separating the two pan elements at the hinge;

FIGURE 8 is an enlarged detail view of an end of the hinge pin; and

Figure 4:
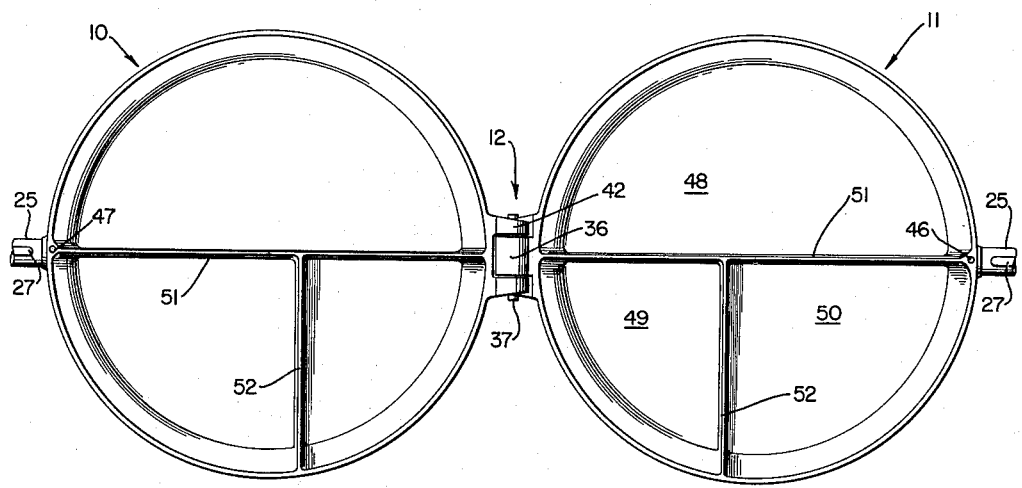
FIGURE 4 is a view similar to FIGURE 1 but illustrating an alternative arrangement of interior compartments.

Referring to FIGURE 1, the numerals 10 and 11 generally designate a pair of complementary pan members adapted to be joined by a hinge structure 12. While as hereinafter described, the utensil may be used with either pan member resting on the heat source, for simplicity in explanation the members 10 and 11 will normally be referred to as the upper and the lower member respectively. The lower member 11 is preferably of unitary cast construction, comprising a base plate 13, a rim 14, and partitions or ribs 15 and 16, the rim and partitions extending vertically from the base plate to define the depth of the pan member and to divide the interior thereof into three compartments 17, 18 and 19. Similarly, the upper pan member 10 comprises base plate 20, rim 21 and partitions 22 and 23 dividing the interior into cavities 17a, 18a and 19a, which match the respective cavities 17, 18 and 19 of member 11.

In the case of each pan member the rims and partitions terminate in a flat plane, so that when the utensil is closed as shown in FIGURES 2 and 3, a sealing joint 24 is formed between all the matching surfaces of the rims and of the partitions which define the interior cavities, and the joined pans may be turned or reversed instead of opening them and individually turning the food.

The upper and lower pan members are provided with matching handles 25, FIGURE 2, carrying corrugated grips 26 of heat-insulating material. These handles are detachably secured in place by means of spring-pressed latches 27 which engage spuds 28 projecting from the rear sides of the pan members, as illustrated in section in FIGURE 5.

The spuds 28 have inclined outer surfaces 29 adapted to engage the inwardly directed detents 30 of the latches to rock the latter against the pressure of compression springs 31, so that to attach the handles it is merely necessary to push them forward until the detents 30 snap into corresponding notches 31 in the spuds.

The contact surfaces of the detents 30 and the notches 32 may be outwardly inclined at a slight angle which together with the location of the fulcrum pins 33 urges to the handles inward to the full extent of the spuds, thus preventing any tendency to looseness or rattling.

In removing the handles, the latches are released by pressing their extended rear corners 34 inward. The handles may be so proportioned as to be readily enclosed within one of the compartments such as compartment 18—18a of the composite utensil when the latter is not in use, thus minimizing the over-all bulk space required either in kitchen storage or in shipment.

For various cooking operations utilizing the utensil in closed position, particularly those wherein turning is involved, the device may be locked shut, by means of a loop catch 35 swivelled in the outer end of one handle and adapted to be swung around into locking engagement with the other as shown in FIGURE 2.

It will be evident from the foregoing description that the device provides a highly convenient means of simultaneously cooking a number of different dishes while keeping the latter effectively separated by the sealing joint 24 formed by the engaging flat contact surfaces of the two pan members. The accurate maintenance of this seal requires that no appreciable looseness can exist in the hinge 12, since lost motion at this point could result in tipping between the pan members and breaking of the seal when the handles 25 are pressed toward each other. At the same time, easy engagement of the hinge is desirable, as well as easy separation at the completion of cooking or when it is desired to use the two pans separately.

These two qualities are achieved in the following manner:

Referring to FIGURES 6 and 7, it will be seen that the lower pan has formed thereon a central hinge lug 36 in which a transverse hinge pin 37 is tightly secured either by means of a retaining pin 38 or if desired, by press fit. Projecting end portions of the hinge pin 37 are partly cut away to form parallel flats 39 and 40 which are directed angularly forward and upward, as best seen in FIGURE 7. The lower edge of the flat 39 is slightly bevelled off to the remaining periphery of the pin so as to form a narrow angular cam surface 41, as shown in enlarged detail in FIGURE 8.

The upper pan 10 carries a pair of formed lugs 42 spaced laterally to straddle the lower pan lug 36 and having substantially key-hole shaped apertures adapted to engage the end projections of the hinge pin 37, each aperture comprising a cylindrical inner zone 43 from which a radial slot 44 extends out through the forward side of the lug.

The diametral dimension of the cylindrical zone 43, which latter extends throughout approximately 270 degrees of arc, is adapted to provide engagement with the remaining peripheral zones 45 of the hinge pin extensions with a snug fit, defined in machine practice as a fit which while allowing sliding movement, permits no appreciable clearance or shake. On the other hand, the width of the slot 44 is substantially greater than the thickness of the hinge pin between flats 39 and 40.

When it is desired to hinge the two pan members together, the upper pan is moved downward at approximately the angle shown in FIGURE 7, the sides of slots 44 passing readily over the flats 39 and 40 on the pin 37, until the upper peripheral zones 45 of the pin are engaged by the inner surfaces of the cylindrical zones 43. The upper pan is then swung toward the closed position, the peripheral zones of the pin and matching cylindrical surfaces 43 mutually centering to provide the previously mentioned snug hinging fit. As the closing operation is started, the above centering action is assisted by the action of the cam surfaces 41 which automatically guide the path into concentric position without requirement for particular care or skill on the part of the user.

When it is desired to separate the parts the reverse of the foregoing procedure is carried out, the snug fit being released as the upper pan swings approximately to the angle shown in FIGURE 7 to permit easy removal. It will be noted that the release angle is such that while the upper pan may be temporarily swung to vertical position for inspection, stirring, etc., of food without release of the accurate hinge fit, withdrawal is accomplished at an angle sufficiently high to prevent interference with other utensils which may be occupying the forwardly adjacent zone of the stove.

If for some purposes it is desirable to use both the pans in open condition but still attached, the upper pan may be swung through the release position into horizontal alignment with the lower pan, during which operation the hinge joint again passes from loose to snug fit, a lower corner camming bevel 41a being provided on the pin 37 to facilitate the transition in the manner previously described.

While the opening and closing actions have been illustrated with the pan 11 normally occupying the bottom position, these operations may be carried out in the same manner when the utensil is disposed in inverted position.

From the foregoing description, it is evident that the structure provides a dual utensil which while readily separable, is adapted to establish and maintain the effective flat sealing joint 24 without the need for gaskets, extensive offsets, grooves and tongues or the like which would present difficulties in proper removal of food residue and washing.

Figure 5:
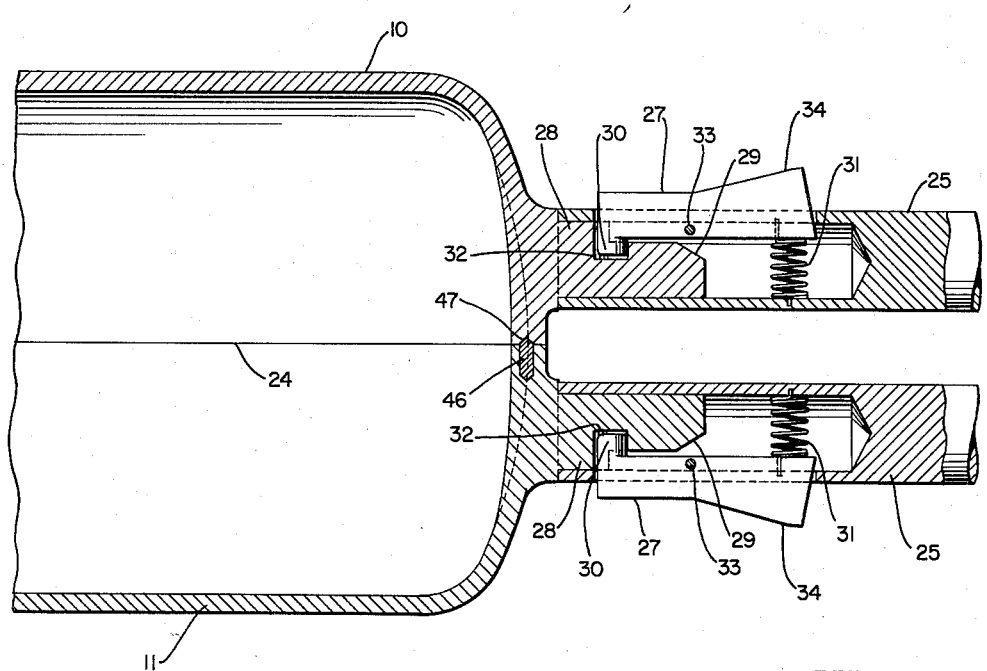
FIGURE 5 is an enlarged fragmental section of the embodiment of FIGURE 1 showing the handle attachments and the rear registry guiding means.

To assist in maintaining accurate lateral registry between the matching rims and internal partitions of the two pan members, a small conical dowel 46, FIGURE 5, is disposed at the rear end of one of the pans (illustrated as the lower pan 11) to engage a corresponding socket 47 in the other pan. This dowel also prevents any tendency to lateral straining of the hinge 12 in case of careless or rough handling of the closed utensil such as knocking against a stove top or burner grid during turning, thus allowing the hinge to be made of minimum width as shown while maintaining a high degree of accurate registry as previously set forth.

In the preferred form of the utensil as shown in section in FIGURE 4, it will be noted that the internal ribs or partitions such as 16 taper uniformly in thickness from their respective base plates to the joint plane 24, and that the depths and proportioning of the two pan members are substantially identical. The tapered rib construction provides for efficient transmission of heat to the sides of the food volumes being cooked, while the practical identity in construction makes cooking characteristics the same regardless of which pan is occupying the bottom position.

The advantage in easy timing for uniform cooking will be evident, particularly when turning is required, since if for example the upper member of such a dual combination were made in the form of a thin sheet metal sealing cover in contrast to the relatively thick cast bottom member, turning could readily result in local scorching of the food unless relatively high timing skill were employed in operating at two differing cooking rates. Uniformity in cooking characteristics is also obviously an advantage when the pans are employed separately, for example when it is desired to cook a double quantity of the same food combination.

In cooking processes requiring occasional release of internal pressures, the catch 35, FIGURE 3, may be left in released position. In such cases the weight of the upper pan holds the utensil closed until the pressure rises sufficiently to tip the upper member slightly upward and effect relief, after which the upper pan drops again into sealing relation, the conical guiding dowel 46 assisting in ensuring proper alignment.

Figure 9:
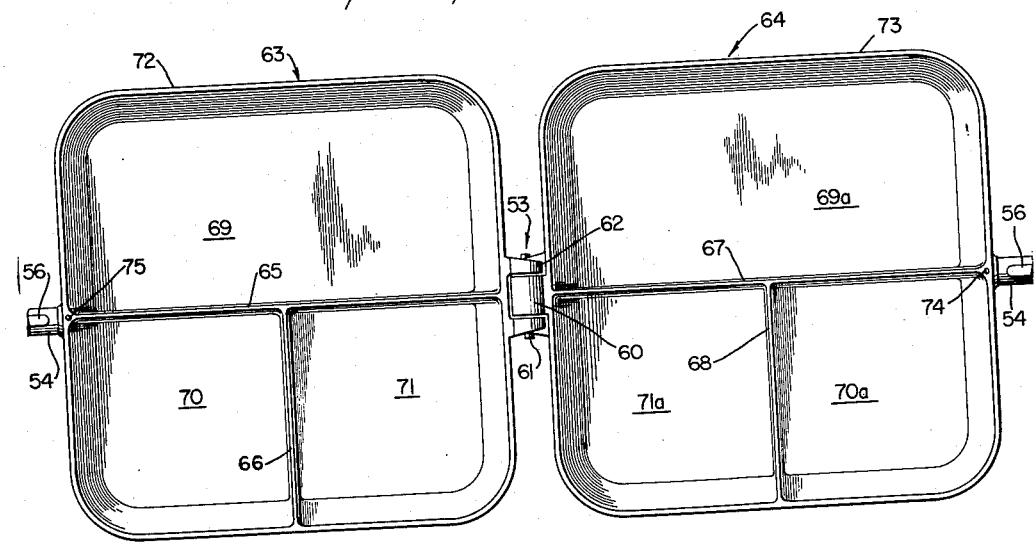
FIGURES 9 and 10 are respectively planned views and side elevations of a similar utensil in which the pans are rectangular instead of round.
Figure 10:
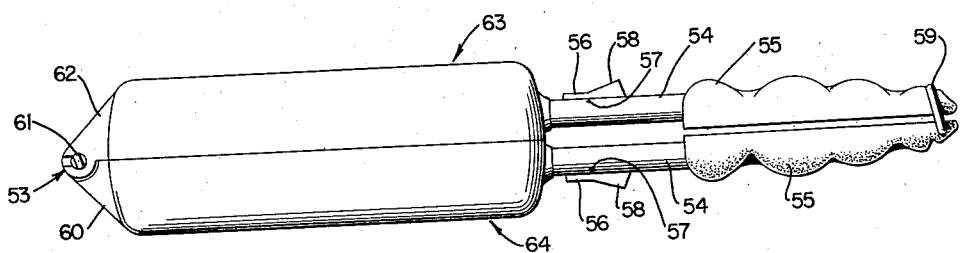

Referring to FIGURES 9 and 10, I show a modified form of the invention in which the pans 63 and 64 are rectangular in form, one of them is provided with a large compartment 69 and small ones 70 and 71 and these are separated by internal ribs or partitions 65 and 66 which taper uniformly in thickness from their respective base plates to the joint plane above referred to and it will be noted that the depth and the proportioning of the two pan members are substantially the same. The other pan member 64 has a large compartment 69a which matches the compartment 69, while smaller compartments 70a and 71a mate with the compartments 70 and 71.

These pans are hinged together with hinge elements 53 which are substantially identical with the hinge elements 12, and the elements 60, 61 and 62 are substantially identical with the elements 36, 37 and 42 respectively.

The handles 55 are detachable and they are substantially identical with the handles 26 described above.

The two pan elements 63 and 64, when they are closed together and secured together by the catch 59, are fluid tight and consequently turning the utensil over to turn the food without opening it, will not result in any spilling of the contents (not even hot grease).

As hitherto set forth, the device has been described as providing three compartments separated by parallel ribs, but it will be obvious that various other internal arrangements can be used, for example that shown in FIGURE 4, in which three unequal compartments 48, 49 and 50 are defined by a diametral rib 51 and a short transverse rib 52.

It will thus be seen that there is provided a device in which the several objects of this invention are achieved and which is well adapted to meet the conditions of practical use.

As possible embodiments might be made of the above invention, and as various changes might be made in the embodiments set forth, it is to be understood that all matter herein set forth or shown in the accompanying drawings is to be interpreted as illustrative and not in a limiting sense.

Having now particularly described and ascertained the nature of the invention, and in what manner the same is to be performed, what is claimed is:

In a cooking utensil, in combination, a pair of pan members of substantial depth each comprising a base plate with a peripheral rim and internal partitions extending from said plate to a common flat plane surface, said rims and partitions of said two pan members being detachably coupled in complementary relationship with said plane surfaces engaged in sealing relationship to establish a plurality of separate sealed compartments within said utensil, a hinge lug on one of said pan members, a transverse hinge pin secured in said lug and including arcuate portions and portions extending therebetween, said extending portions having flat diametrically opposite sides in inclined planes spaced apart a distance substantially less than the peripheral diameter of said pin, a pair of hinge lugs on said other pan member operatively disposed to straddle laterally said first lug and each having an aperture comprising an inner circular zone of arcuate extent substantially greater than 180 degrees and a radial slot extending outward therefrom, said circular zones being dimensioned to engage said peripheral portions of said pin in snug moving fit relation and said radial slots being of widths adapted to permit passage of the sides thereof over said flat portions in loose clearance relation, said pin further having camming surfaces connecting at least one peripheral portion to said extending portions for guiding the circular zone into concentric relationship with said peripheral portions, a tapered dowel on one of the pan members, the other pan member being provided with a corresponding recess in which said dowel is engaged; and handle means on each of said pan members opposite said hinging lugs locking the pan members together.

References Cited in the file of this patent

UNITED STATES PATENTS

| | | |
|---|---|---|
| 472,811 | Pickett et al. | Apr. 12, 1892 |
| 770,595 | Lovette | Sept. 20, 1904 |
| 1,500,163 | Tate | July 8, 1924 |
| 1,732,347 | Weisenborn | Oct. 22, 1929 |
| 1,745,592 | White | Feb. 4, 1930 |
| 2,011,675 | Cawood | Aug. 20, 1935 |
| 2,398,573 | Becker | Apr. 16, 1946 |
| 2,555,473 | Deaton | June 5, 1951 |
| 2,712,151 | Becht | July 5, 1955 |

FOREIGN PATENTS

| | | |
|---|---|---|
| 618,827 | Great Britain | Feb. 28, 1949 |